United States Patent [19]

Stonier

[11] Patent Number: 4,775,069
[45] Date of Patent: Oct. 4, 1988

[54] FOLDABLE BOX FOR HANGING FILES

[76] Inventor: Russ W. Stonier, 1340 N. Astor St., Chicago, Ill. 60610

[21] Appl. No.: 76,881

[22] Filed: Jul. 23, 1987

Related U.S. Application Data

[62] Division of Ser. No. 872,829, Jun. 11, 1986.

[51] Int. Cl.$^4$ ............................................. B65D 7/24
[52] U.S. Cl. ........................................ 220/6; 312/184
[58] Field of Search ............................ 220/6; 312/184

[56] References Cited

U.S. PATENT DOCUMENTS

| | | | |
|---|---|---|---|
| 833,269 | 10/1906 | Weis | 220/22.1 X |
| 1,416,661 | 5/1922 | Barnhart | |
| 2,187,113 | 1/1940 | Ehcenzweig | 129/16 |
| 3,372,829 | 3/1968 | Averill | 220/6 X |
| 3,456,994 | 7/1969 | Sullivan | 312/184 |
| 3,527,339 | 9/1970 | Cipolla | 220/6 X |
| 3,682,522 | 8/1972 | Splan | 312/184 |
| 3,796,342 | 3/1974 | Sanders et al. | 220/6 |
| 3,844,416 | 10/1974 | Potter | 211/162 |
| 3,854,544 | 12/1974 | Kolchev | 180/14 E |
| 3,865,269 | 2/1975 | Coleman | 220/6 |
| 3,938,870 | 2/1976 | Guest et al. | 312/184 |
| 4,030,610 | 6/1977 | Alexander | 312/184 X |
| 4,213,225 | 7/1980 | Timmer | 16/29 X |
| 4,234,238 | 11/1980 | Figueroa | 312/184 |
| 4,262,810 | 4/1981 | Ilich | 312/184 X |
| 4,505,388 | 3/1985 | Solomon | 206/425 |

OTHER PUBLICATIONS

Sales brochure of Tristar Industries, 210 Franklin Street, Paterson, N.J. 07524 (undated).
Sheets attached to "Multibox" made by Nijhof Luxe Metaalwaren by, Einsteinstraat 10, 6902 PB, Zevenaar, Holland (undated).

*Primary Examiner*—Steven M. Pollard
*Attorney, Agent, or Firm*—Laff, Whitesel, Conte & Saret

[57] ABSTRACT

A foldable file box receives hanging files. In one embodiment resilient rails are removably inserted by flexing the rails and inserting their ends into sockets formed in the sides of the box. The file box has a bottom panel, a generally rectangular top channel frame, and inwardly collapsible side panels. An end panel at each end of the box is hinged to a corresponding end piece of the top frame. When they swing down to a vertical position, the end panels lock the collapsible side panels to erect the box. In order to receive and maintain a pair of file rails in a spaced parallel relationship, aligned sockets are provided at the ends of the rails so that the file rails may be inserted therein by flexing. Alternatively, the file rails may be integrally molded into the box. For portability, various rolling supports, such as easily attachable rollers or a dolly, may be added to the file box.

18 Claims, 5 Drawing Sheets

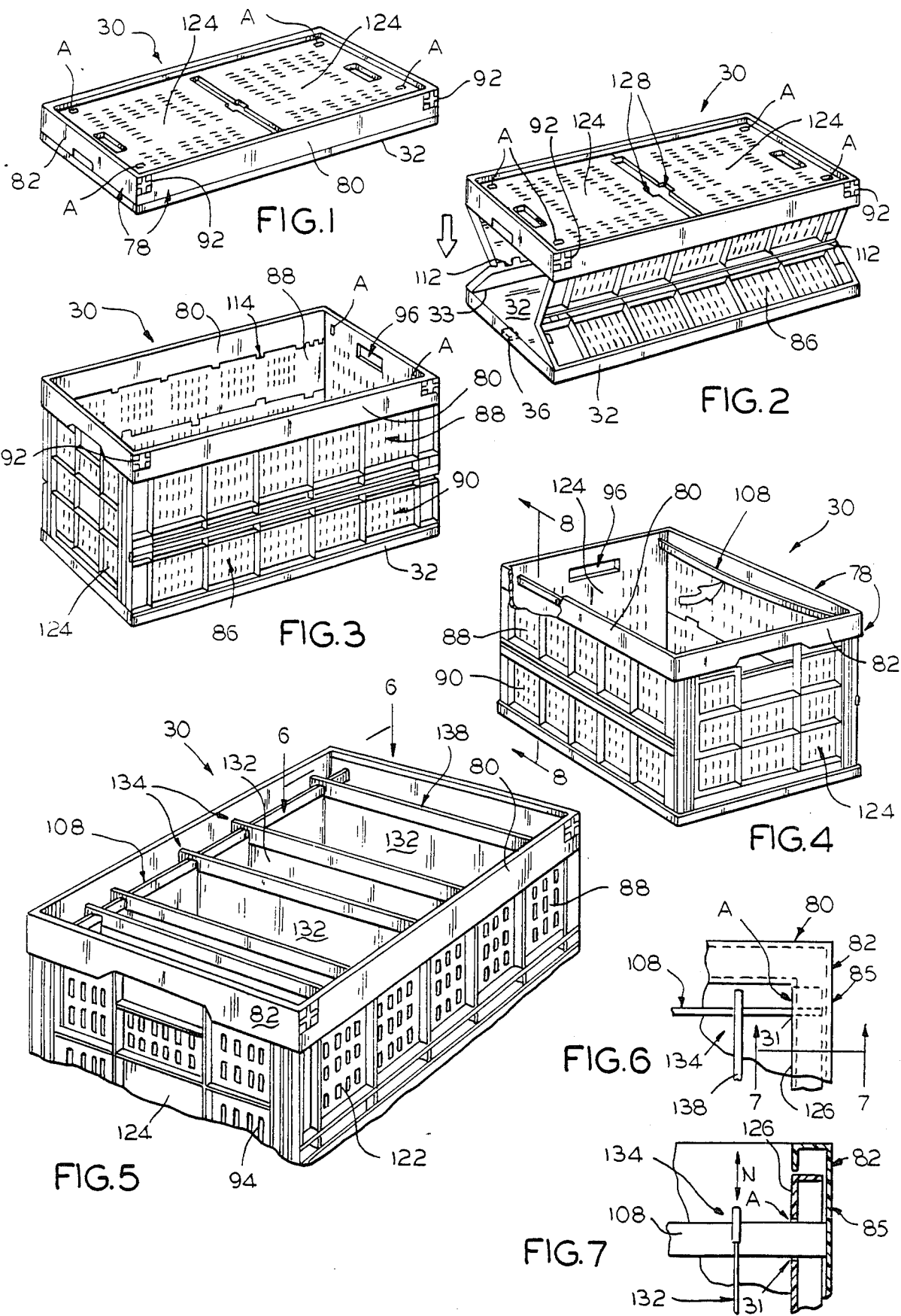

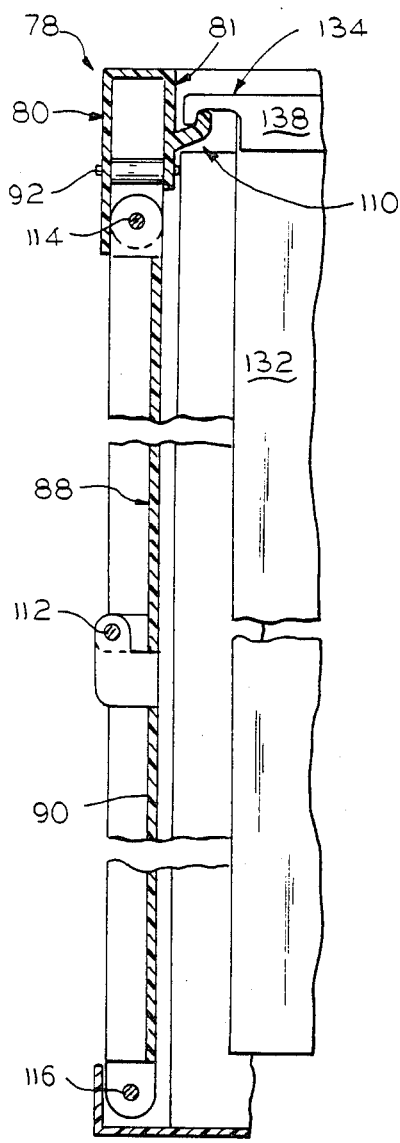
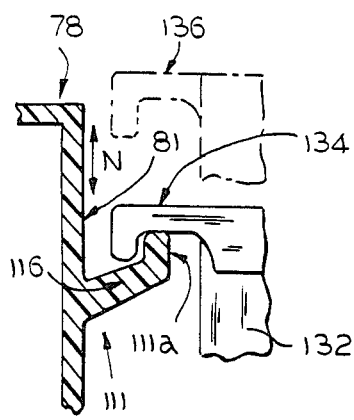
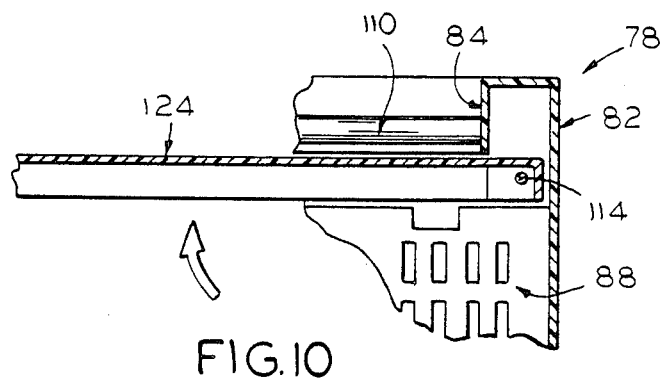
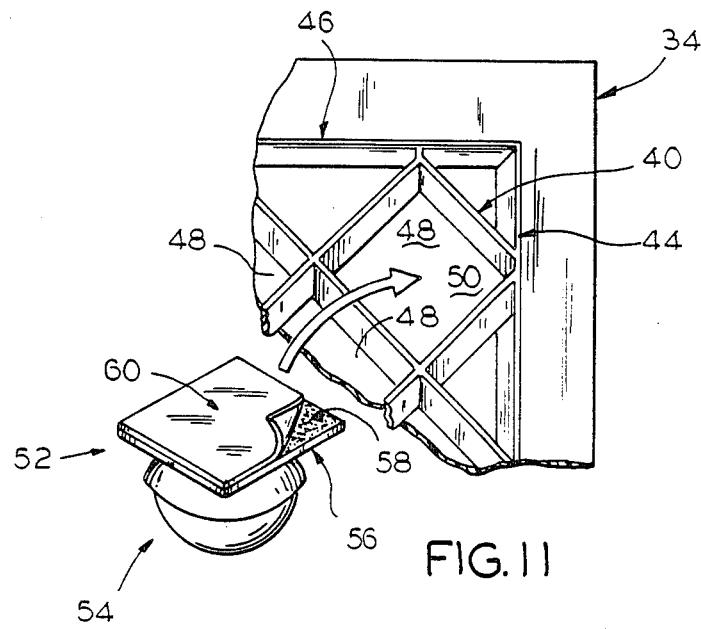
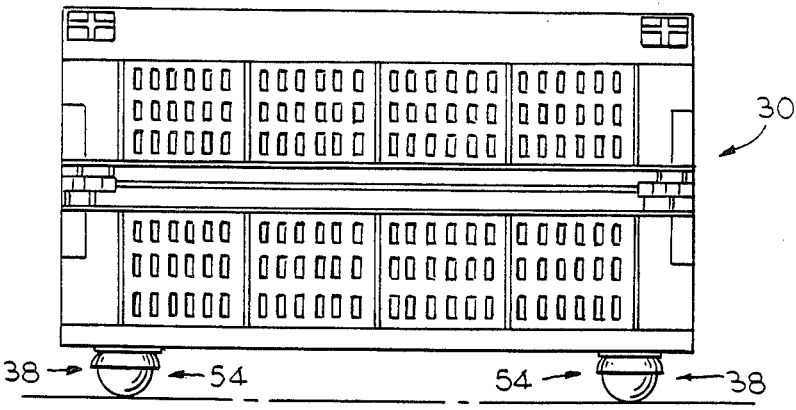
FIG.8
FIG.9
FIG.10
FIG.11
FIG.12

FOLDABLE BOX FOR HANGING FILES

BACKGROUND

This application is a division of copending application Ser. No. 872,829, filed June 11, 1986.

This invention relates to file boxes, and more particularly to foldable or collapsible file boxes for hanging files.

File boxes that can be compactly collapsed when empty but opened to full storage size for use offer convenience to both suppliers and users of such boxes since they save storage space and are easier and less bulky to ship and move. However, many collapsible file boxes, for example those made of cardboard, are not very rugged and are inconvenient to use with hanging files.

A hanging file folder system in which the file folders are suspended from rails in the file box rather than resting on its bottom has an advantage over conventional files of easier, speedier filing and retrieval because with the touch of a finger the folders glide along the rails. Heretofore it has been difficult to combine the benefits of a foldable file box with a hanging file folder system because the latter requires that horizontal supporting file rails be somehow incorporated into the file box, which can interfere with a folding and stacking of the file boxes. For example, some companies sell bulky metal frames incorporating the hanging file rails that must be separately purchased, assembled, and placed in the file box. Other companies offer file rails that are attached to the top rim of the file box, where they are potentially exposed to damage and can interfere with nesting of a stack of such file boxes.

Accordingly, an object of this invention is to provide a new and improved folding file box for hanging files. Another object is to provide a simple and inexpensive folding file box that easily stacks by nesting in a similar file box, even when hanging files are installed. Yet another object is to provide a folding file box that also stacks when the files are removed and the box is folded up without removing the file rails.

It is a further object of this invention to provide an easy way to fit such a file box with supports, such as rollers to facilitate movement of the file box both when full of files and when empty and folded up. It is also an object of this invention to facilitate the moving of many such file boxes at one time by providing a dolly adapted for use with them.

BRIEF SUMMARY OF THE INVENTION

In keeping with one aspect of this invention, a foldable file box for hanging files has resilient file rails removably inserted by flexing the rails. The file box has a bottom panel, a generally rectangular top channel frame, and an inwardly collapsible side-panel for each side. The side panels are rotatably joined along the top to a respective sidechannel of the top frame and rotatably joined along the bottom to a respective side of the bottom panel. An end panel at each end of the box is rotatably joined at its top to a corresponding end piece of the top frame. When the end panel is swung down to a vertical position, it cooperates with the bottom panel and the collapsible side panels to lock the box in an open condition. Opposed pairs of rail sockets are provided adjacent the top portion of the box into which the resilient file rails can be inserted if the rails are slightly flexed or bowed during insertion. Alternatively, the file rails may be affixed to or part of the top channel frame, as by integral molding, for example.

The invention includes embodiments where the file rails are sufficiently vertically recessed so that several such file boxes, whether open or folded, can be stacked by nesting. There are also embodiments which permit an empty file box to be collapsed without removal of the file rails. For portability, various rolling supports, such as easily attachable rollers or a dolly, may be adapted to easily fit on the filebox bottom. The dolly may be sufficiently wide to simultaneously receive several similar file boxes, in a side-by-side position.

BRIEF DESCRIPTION OF THE DRAWINGS

The above mentioned and other features of this invention and the manner of obtaining them will become more apparent, and the invention itself will be best understood by reference to the following description of embodiments of the invention taken in conjunction with the accompanying drawings, in which:

FIG. 1 is a perspectiv view of one embodiment of the invention, showing the box empty and collapsed with its file rails removed;

FIG. 2 is a perspective view of the embodiment of FIG. 1 in a partially opened condition;

FIG. 3 is a perspective view of the embodiment of FIG. 1 in a fully opened condition, ready to have the file rails installed;

FIG. 4 is a perspective view of the embodiment of FIG. 1 showing installation of a file rail by flexing or bowing the rail;

FIG. 5 is a partial perspective view showing the embodiment of FIG. 1 ready for use with the file rails and hanging file folders installed;

FIG. 6 is a partial top plan view taken along 6—6 of FIG. 5;

FIG. 7 is a partial cross section taken along 7—7 of FIG. 6;

FIG. 8 is a partial transverse cross section of one side of a second embodiment of the invention in which a file rail is attached to or part of a side piece of the top frame;

FIG. 9 is a partial enlarged view of the transverse cross section of FIG. 8 showing the relationship between a hanging file folder endhook and the attached rail which supports it;

FIG. 10 is a partial longitudinal cross section of one end of the embodiment of FIG. 8 showing the relationship of a raised end panel to the attached file rail;

FIG. 11 is a partial elevation of the bottom face of a bottom panel of a file box according to the invention, showing its relationship to a roller, shown in perspective, that can be attached to it;

FIG. 12 is a side elevation of a file box according to the invention provided with rollers on its bottom;

DESCRIPTION OF THE PREFERRED EMBODIMENTS

Figure 13:
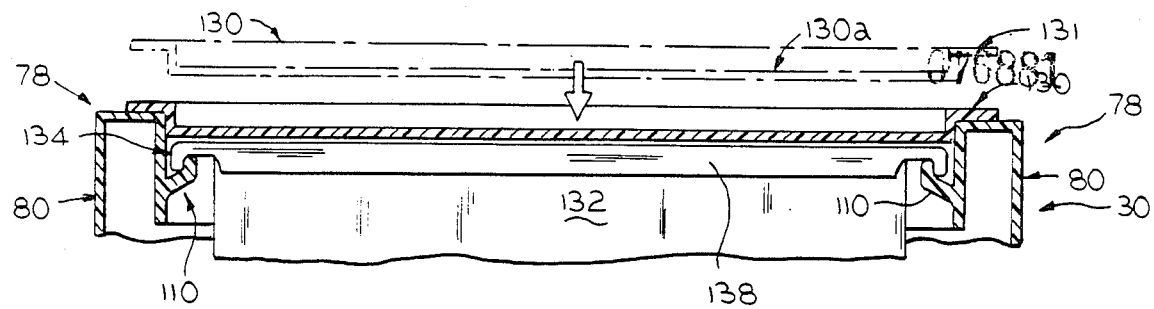
FIG. 13 is a partial transverse cross section of the second embodiment showing how a cover may be nested into the top of the file box.

As shown in FIGS. 1–3, a foldable file box 30 for hanging files includes a bottom panel 32, a generally rectangular top channel frame 78, and an inwardly collapsible side panel 86, composed of an upper side panel 88 and a lower side panel 90 joined by a middle hinge 112. The side panels 86 are rotatably joined at the top by a hinge 114 to a respective sidechannel or side piece 80 of the top frame, and also rotatably joined along the bottom to a respective side edge 33 of the bottom panel. An end panel 124 at each end of the box 30 is rotatably joined by an end panel hinge 92 to a corresponding end piece 82 of the top frame 78 and cooperates, when swung down to a vertical position, with the bottom panel 32 and the collapsible side panels 86 to lock open the box 30 for use. For ruggedness, such a box may be made of a durable material, such as molded plastic. To avoid inadvertent collapse, it can further incorporate additional locking means, shown generally as a locking member 36 on the bottom panel 32 adapted to cooperate with the bottom edge 128 of the end panel 124. Examples of this general type of box are one colled "MULTIlBOX" by Nijhof Luxe Metaalwaren by of Zevenaar, Holland, another called "STARPLAST" which is made in Israel but distributed in the U.S.A. by Tristar Industries of Paterson, N.J., and the folding box shown in U.S. Pat. No. 3,796,342.

As shown in FIG. 1, when folded or collapsed the box 30 occupies only a fraction of the space of the fully opened box, which is a very useful advantage.

FIGS. 4–7 show the box 30 with a pair of rails 108 for supporting hanging file folders 132. The file rails 108 are maintained in a spaced parallel relationship by opposed rail socket means, such as rail sockets A (FIGS. 6 and 7) adjacent the top portion of the box 30. The resilient file rails 108 are inserted into the sockets A by bowing or flexing during insertion, as shown in FIG. 4. While the file rails can be of any suitable material, a flattened steel wire or stock which is about ⅜ inch wide and about 1/16 inch thick works well if the wire or edges are rounded to reduce friction when the files are slid on the wire or edge. The wire ends are deburred for safety.

The partial top plan view of a corner (FIG. 6) and the partial cross section of FIG. 7 show how an orifice or aperture 31 is matched to the transverse cross section (illustratively rectangular) of the file rail 108. Conveniently, aperture 31 forms a suitable socket A near the top 126 of the inner face of end panel 124. The socket's interior end is closed off by the outer face 85 of the frame end piece 82 when the end panel 124 is in its vertical (opened) position. In FIG. 5 the file box is shown in use with hanging file folders 132 each having a file folder bar 138 with an endhook 134 at each end, supported by one of the file rails 108. As shown in FIG. 7, this construction provides sufficient vertical recessing N to enable a stacking of a similar box, or insertion of a cover, having a nesting protrusion (see protrusion 130a of FIG. 13), even with the the hanging files in place.

Figure 20:
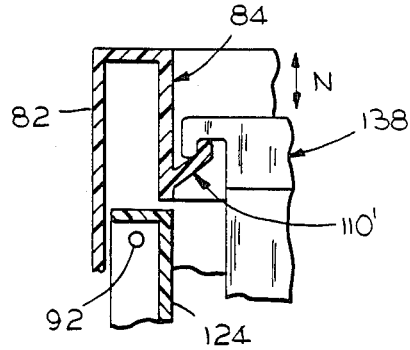
FIG. 20 is an enlarged partial longitudinal cross section of a fourth embodiment of the invention in which the file rails are attached to the end pieces of the top frame.

A second embodiment of the foldable file box of the invention is shown in FIGS. 8, 9, 10, 13 & 14 wherein the file rails 110 may be of a kind which are affixed to an integral part of the top channel frame 78, for example, on the inner face 81 of a side piece 80. Or the file rails may be attached on the inner face of an end piece 82 of the top channel frame 78, as shown in FIG. 20. Such file rails may be separately formed and attached. However, it is convenient to form them integrally with the top channel frame. Note that in the integral rail embodiments there can also be recessing N, as shown in FIGS. 9 and 20, to provide for nesting and stacking of the file boxes. FIG. 9 shows in cross section a preferred shape 111 of an integral rail, having an arm portion 111b supporting a finger portion 111a, these two portions being shaped to smoothly accommodate the various conventional end hooks 134, 136 found on the hanging file folders 132 of different makers.

FIG. 11 shows a convenient way to attach a caster 54 or other roller means to the bottom face 34 of the bottom panel 32 of the file box, by taking advantage of a honeycomb-like protrusion 46 which is provided to strengthen the bottom panel 32. Such a honeycomb forms cells 48, selected ones of which can be used to receive a baseplate 60 of the caster 54, which can be affixed thereto by means of an adhesive layer 58 on the baseplate which is protected by a release paper 60 until use. The resulting portable file box is shown in FIG. 12.

Figure 14:
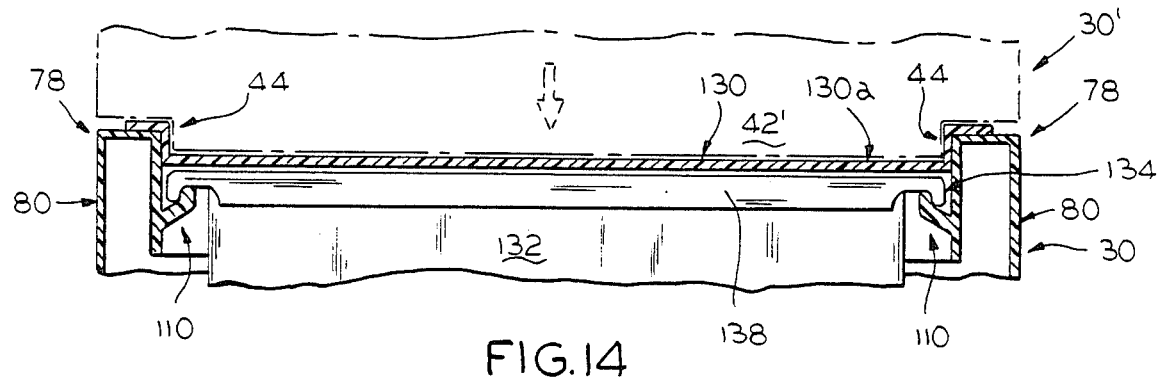
FIG. 14 is a partial transverse cross section of the second embodiment showing another box nested into the covered file box.

FIGS. 13 and 14 show how easy it is, with the invention construction, to also nest a cover 130 (shown approaching in phantom as 131) into file box 30. To facilitate nesting, the cover 130 preferably has a suitable protrusion 130a fitting in the top of box 30. Another and similar file box 30' having bottom protrusion 42' may be nested in place of cover 130 in the file box top (FIG. 16); or if desired, the other box 30' may be nested in cover 130 (FIG. 14).

Figure 15:
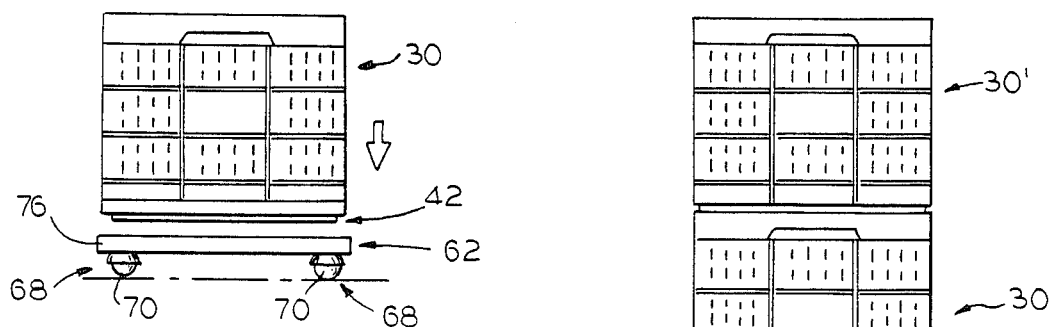
FIG. 15 is an end elevation of a file box according to the invention in the process of being nested onto a dolly adapted to carry the file box.
Figure 16:
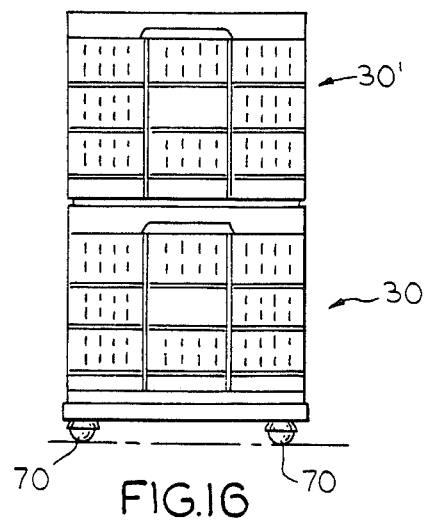
FIG. 16 is an end elevation of the file box of FIG. 15 now fully loaded on the dolly with a second similar file box nested on top of the first.
Figure 17:
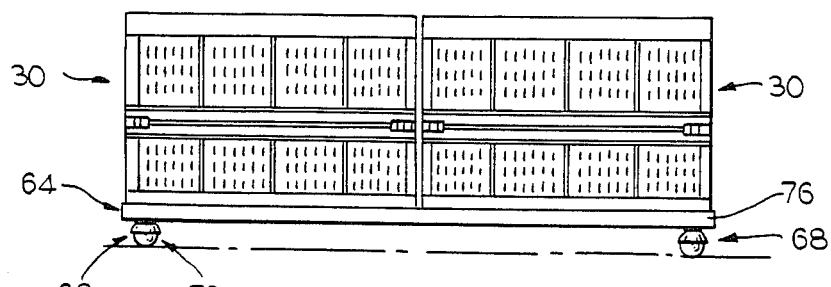
FIG. 17 is a side elevation of another dolly according to the invention, the dolly being large enough to carry two file boxes.

A dolly 62 may also be provided, as shown in FIGS. 15 and 16, for accommodating a single file box. Dolly 64 shown in FIG. 17 may be used for accommodating several boxes in a side-by-side relationship.

Figure 18:
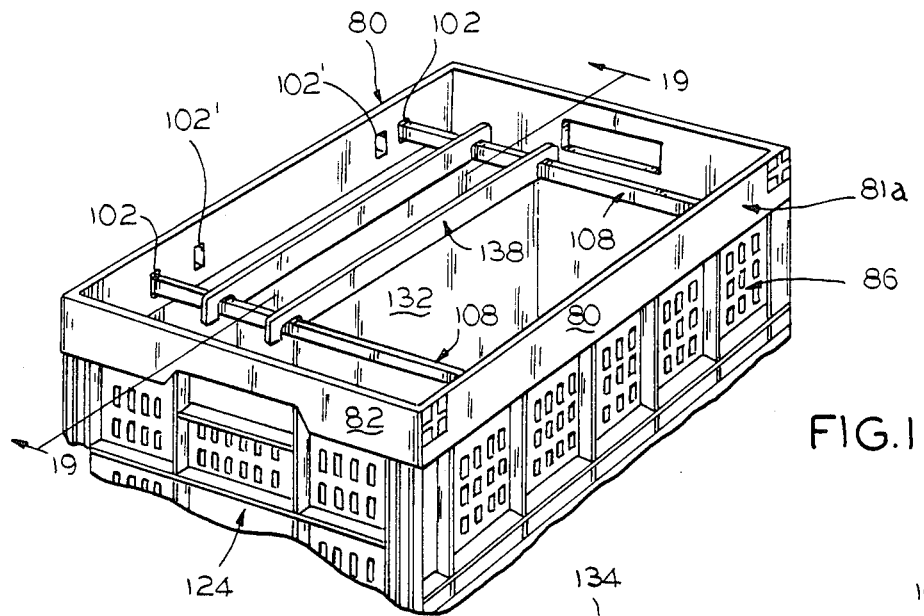
FIG. 18 is a partial perspective view of a third embodiment of the file box of the invention in which file rails are inserted into sockets in the frame side pieces of the file box.
Figure 19:
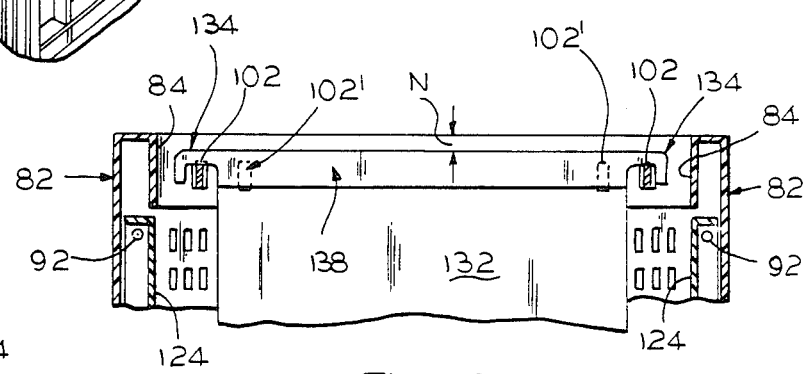
FIG. 19 is a partial longitudinal section along lines 19—19 of FIG. 18.

FIGS. 18–20 show an alternative embodiment of the invention where the rails extend transversely across the width of the box. This embodiment is particularly designed for use with longer paper, such as legal documents, maps, or the like.

There are a series of apertures 102, 102' in the inner face 81 of frame side piece 80 to form the socket means for the rails. These apertures may be selected on a basis of the length of the paper to be filed. For example, thirteen inch paper may use file folders 132 which fit over rails inserted in apertures 102'. Fourteen inch paper may use file folders 132 which fit over rails into apertures 102. In a similar manner, it may be convenient to use one of the apertures 102 and one of the apertures 102', in order to fit and support some other size of file folder. While the sockets are preferably in the inner face 81 of the frame side piece 80, if desired they could instead by incorporated into the inner face of the upper side panel 88.

FIG. 19 is a side elevation taken along line 19—19 of FIG. 18 to show how the file folders are recessed a distance N below the top edge 105 of the box. This recessing provides means for stacking boxes by enabling the bottom of an upper box to fit down into and sit upon the top of a lower box.

FIG. 20 illustrates a rail 110' which is integrally molded along the inner face 84 of one of the frame end pieces 82 to reduce the cost of manufacture and labor, which is otherwise required to make and insert the resilient metal rails. Except for being on the frame end piece instead of the frame side piece, this feature is essentially the same as the feature shown in FIG. 9. Again, the hanger 138 is a distance N below the top edge 105, so that the boxes may be stacked.

Figure 21:
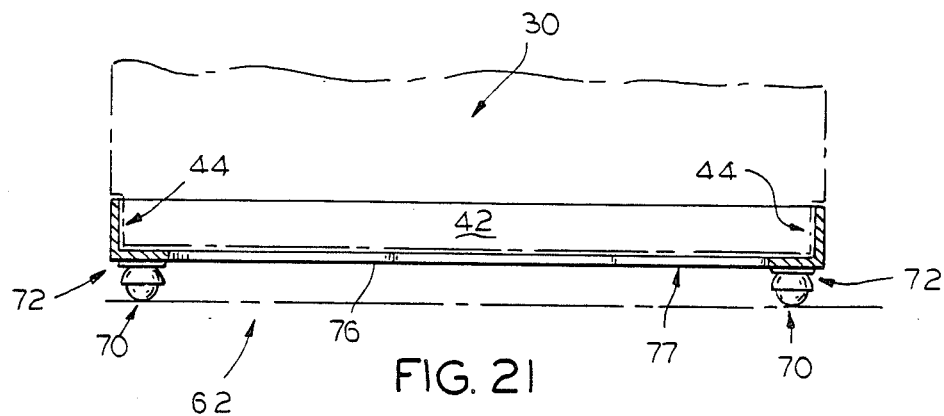
FIG. 21 is a partial transverse cross section showing a file box nested in a recess of a third dolly.
Figure 22:
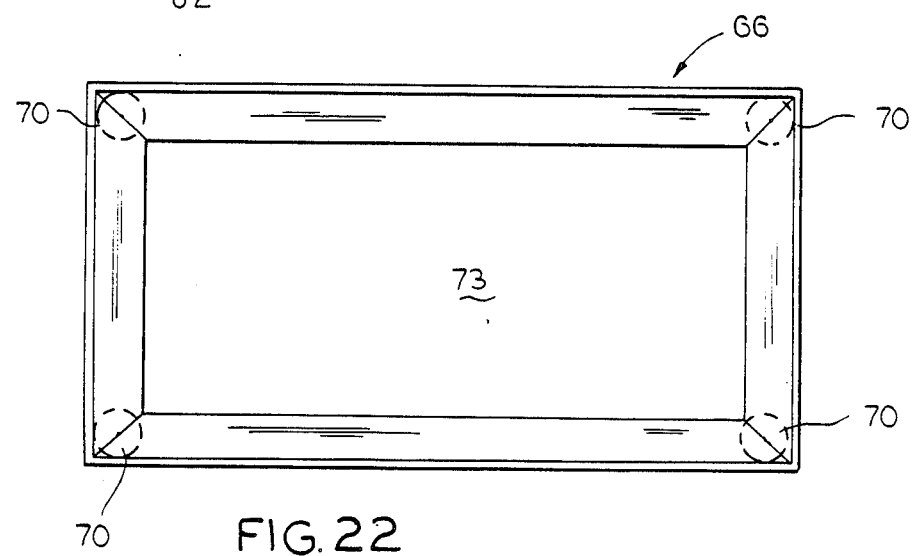
FIG. 22 is a top plan view of a fourth dolly constructed as an open frame.
Figure 23:
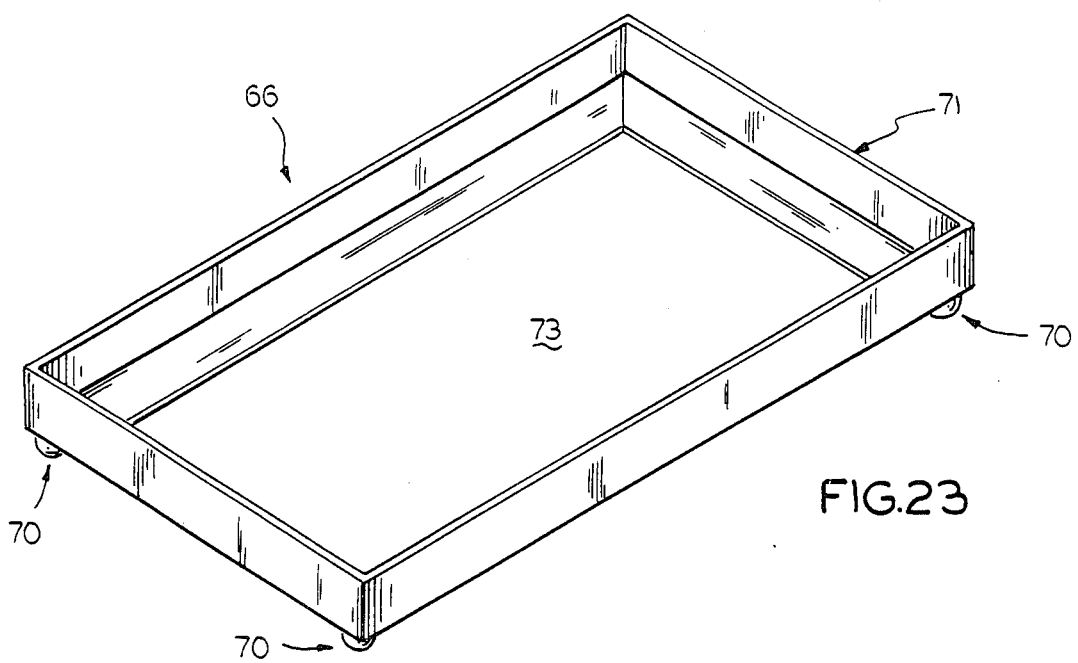
FIG. 23 is a perspective view of the dolly of FIG. 22.

FIG. 21 shows a suitable construction for the dolly's support base 75 having a recess 77 to provide for nestingly receiving a bottom projection 42 of the file box which is placed directly on the dolly. FIGS. 22 and 23 show an alternative open frame dolly 66, which is made of angle irons 71 formed into a rectangle with attached roller feet or casters 70. The open area 73 of the frame is a suitable recess to accommodate the bottom protrusion 42 of the box bottom.

Those who are skilled in the art will readily perceive how to modify the invention. Therefore, the appended claims are to be construed to cover all equivalent structures which fall within the true scope and spirit of the invention.

The invention claimed is:

1. A collapsible box for supporting and holding hanging files having hooks projecting from upper corners thereof, said box comprising:
    four sides and a bottom panel interconnected to form a generally rectangular shape; a first two of said sides being hinged to fold onto the bottom panel to provide a compact structure form and to fold into an upright and erect box,
    the other two of said sides being hinged to swing to a position parallel to said bottom panel when said box is in said compact structure form and to swing to an upright locking position when said box is in said erect form; and
    a pair of spaced parallel rail members mounted in the box and separated from each other by a distance equal to a distance between said hooks for supporting the hanging files,
    said spaced parallel rails being integrally formed on the first two sides and a predetermined distance below the top of said box and on confronting surfaces of said first two sides; said integral rail members projecting from inside surfaces of said first two sides and into said box far enough to receive the hooks of the files but sufficiently above the hinged tops of said other two sides so that said other two sides may swing to said position parallel said bottom panel and remain below said projecting rails.

2. A folding plastic box for storing hanging files suspended by corner hooks, said box having a generally rectangular base with two opposing side panels hinged to opposite sides of said base, said side panels being further hinged in approximately their middles to fold along a line parallel to the opposite sides of said base, end panels pivotally connected at upper corners of said opposing side panels, said end panels swinging up on said pivots to enable the box to be moved to a compact condition or swing down to enable said box to be moved to an erect position, four sockets integrally formed in two confronting pairs on the inside of said box near the tops of said corners, and two side rails, said sockets being positioned to support said rails in a spaced parallel relationship at a distance which supports the hooks on the hanging files, said sockets being formed to preclude longitudinal movement of said rails by a distance which would enable said rails to be dislocated responsive thereto.

3. The folding box of claim 2 and roller mounting assembly for a storage box having a bottom panel, said assembly comprising at least one support area on an outside surface of the bottom panel near each corner of the box, each of said support areas having a cellular box-like honeycomb structure, and rolling support means comprising a caster and a baseplate adhesively attached to each of the support areas within a respective cell of the honeycomb structure, whereby said box may be rolled about.

4. The roller mounting assembly of claim 3 wherein said baseplate has an adhesive layer and release paper covering the adhesive layer, whereby the caster may be affixed to one of the support areas by removing the release paper and pressing the caster against the support area.

5. The roller mounting assembly of claim 3 wherein each of said rolling support means has a baseplate fitting into a cell of said honeycomb structure.

6. The roller mounting assembly of claim 3 wherein said baseplate has an adhesive surface which is adapted to bond said baseplate to the bottom of said cell.

7. A collapsible box for supporting and holding hanging files on hooks projecting from upper corners thereof, said box comprising:
    four sides and a bottom panel hingedly interconnected to form a generally rectangular shape; a first two of said sides folding onto the bottom panel to provide a compact structure form and folding into an upright and erect box form;
    the other two of said sides swinging to a position parallel to said bottom panel when said box is in said compact structure form and swinging to a locking position when said box is in said erect form;
    a pair of spaced parallel rail members having opposing ends mounted on the box and separated from each other by a distance equal to a distance between said hooks for receiving and supporting the hanging files,
    four sockets integrally formed and respectively located on the inside of said box near the top of four corners of said box for providing the mounts for said ends of said rail members, said sockets being located to form two confronting pairs of sockets for receiving and supporting the ends of said rails in said spaced parallel relationship, and
    means associated with said four sockets for precluding said rails from sliding longitudinally within the box far enough to become dislodged from the sockets.

8. The box of claim 7 wherein said first two sides are longitudinal side panels of said box and the rail members extend along and above inner faces of said longitudinal side panels.

9. The box of claim 7 wherein said spaced parallel rail members are located a predetermined distance below a top surface of said box and the bottom panel of said box has a protruding shape which nests within said predetermined distance at the top of said box.

10. The box of claim 7 and a cover member having a lower surface with a protruding shape which nests within said predetermined distance at the top of said box.

11. The box of claim 7 wherein said other two of said sides are end panels of said box and said spaced parallel rail members extend perpendicular to said end panels.

12. The box of claim 7 and a dolly for receiving and supporting said box, said dolly having a base which is an open metal frame.

13. The box of claim 7 and a dolly for receiving and supporting said box, said dolly having a base which includes a tray having top and bottom faces, and a bottom of said box and the top face of said tray having corresponding and complementary shaped surfaces wherein the tray matingly receives the bottom of the box.

14. The box of claim 7 wherein an outside surface of said bottom panel has at least one support area near each corner of said box, and rolling support means attached to each of said support areas on the bottom panel, whereby said box may be rolled about.

15. The box of claim 14 wherein the rolling support means is adhesively attached to said support areas.

16. The box of claim 14 wherein the rolling support means comprises a caster and a baseplate, said baseplate having an adhesive layer and release paper covering the adhesive layer, whereby the caster may be affixed to one of the support areas by removing the release paper and pressing the caster against the support area.

17. The box of claim 14 wherein said bottom panel has a lower surface, at least each of said support areas having a cellular box-like honeycomb structure, and each of said rolling support means has a baseplate fitting into a cell of said honeycomb structure.

18. The box of claim 17 wherein the baseplate has an adhesive surface which is adapted to bond said baseplate to the bottom of said cell.

* * * * *